Aug. 2, 1949. O. W. CASS 2,478,152
PREPARATION OF CHLORAL AND CHLORAL HYDRATE
Filed March 17, 1944
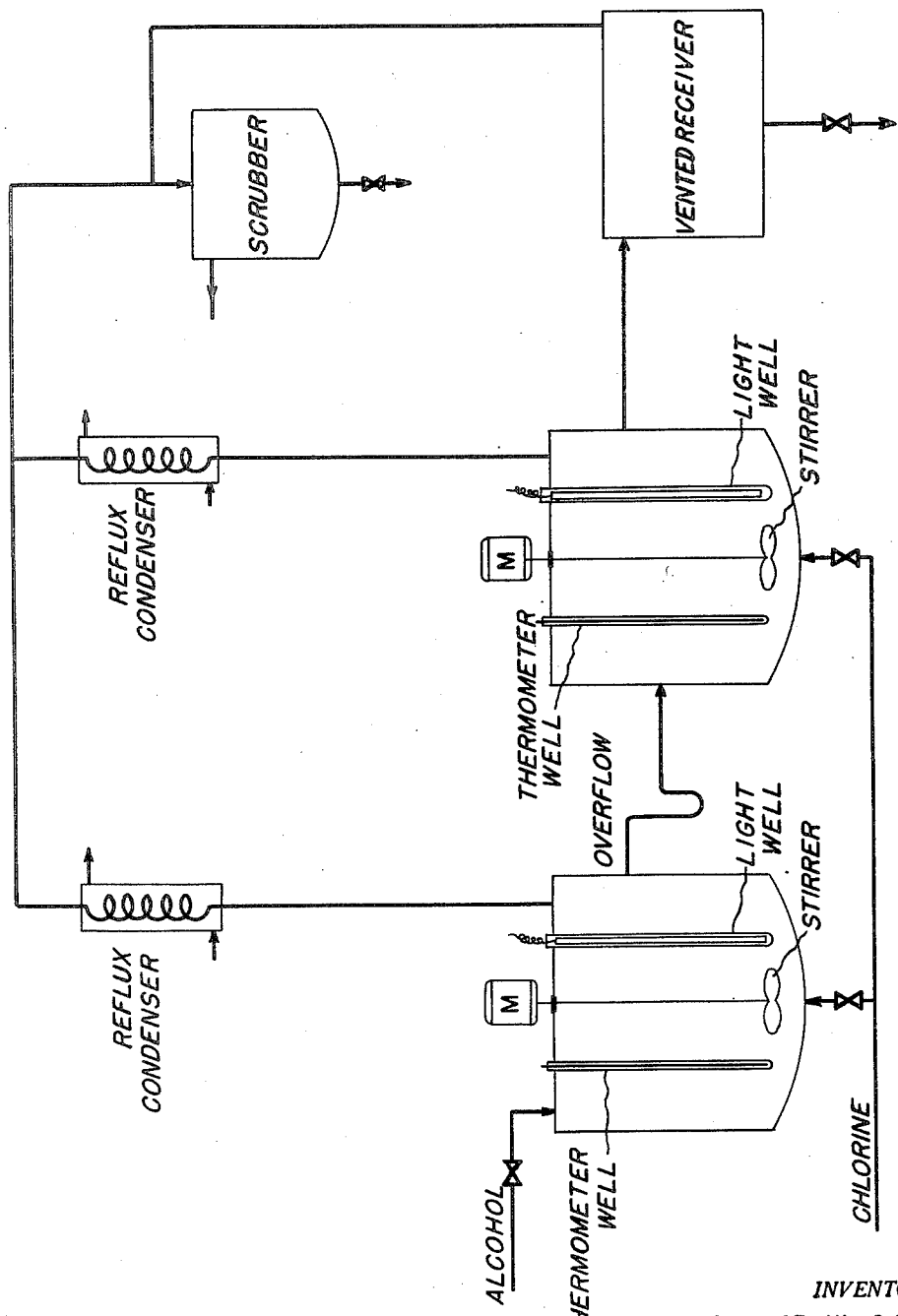
INVENTOR.
OLIVER W. CASS
BY
ATTORNEY Patented Aug. 2, 1949

2,478,152

UNITED STATES PATENT OFFICE 2,478,152

PREPARATION OF CHLORAL AND CHLORAL HYDRATE

Oliver W. Cass, Niagara Falls, N. Y., assignor to E. I. du Pont de Nemours & Company, Wilmington, Del., a corporation of Delaware Application March 17, 1944, Serial No. 527,012

1 Claim. (Cl. 204—163)

This invention relates to the manufacture of chlorinated products by the chlorination of ethanol (ethyl alcohol). More particularly, it is directed to the manufacture of chloral and chloral hydrate by reacting chlorine and ethanol.

The preparation of chloral and chloral hydrate by the chlorination of ethanol has previously been known, but the processes heretofore employed have been unsatisfactory for a number of reasons. Those processes are slow, hazardous, and involved, and the yields are uniformly low. While such procedures may be acceptable for preparing small amounts of chloral and chloral hydrate, they are not suitable for the commercial manufacture of these products in large volume.

The commercial process previously available is generally described as follows (e. g. in "Unit Processes in Organic Synthesis" by P. H. Groggins, pp. 192-4): A reaction vessel is two thirds filled with absolute alcohol, and a stream of chlorine gas under very moderate pressure is injected. Since there is considerable danger that the alcohol may become ignited during the initial stages, the current of chlorine is finely divided by passing it through a circular screen perforated with fine holes.

A period of three days is necessary for completion of the process. During the first day it has been considered essential to maintain the temperature of the alcohol as low as possible. This has usually been accomplished by providing a cooling coil in the reaction vessel through which calcium chloride brine is circulated.

from the other by a reflux condenser provided with a safety diaphragm. The hydrochloric acid that finally escapes is free from chlorine and is condensed and absorbed by usual methods. The chloral alcoholate formed is allowed to crystallize in a cooled, lead-lined vessel. It is then decomposed by treatment with sulfuric acid in a vessel lined with lead and provided with a lead steam coil. This vessel is connected to a lead-lined column filled with Raschig rings which, in turn, communicates with a cooler. The cooler may be employed either as a reflux or as an ordinary condenser.

The crystals of chloral alcoholate are charged into the vessel, and an equal volume of 95–96 per cent sulfuric acid is added intermittently in small quantities. The mass must be maintained cool, as premature warming is detrimental to the success of the operation. The heating is very gradual and, with the cooler acting as a reflux condenser, escaping hydrogen chloride vapors are withdrawn and absorbed. The decomposition of the alcoholate is complete when the evolution of hydrogen chloride ceases. The contents of the vessel, which have at this time assumed a dark color, are fractionated. Ethyl chloride distills off first, followed by ethanol, and finally anhydrous chloral. Conversion of the chloral into the solid chloral hydrate is effected by adding the theoretical quantity of water, the temperature being maintained below about 70° C.

The following mechanism for the reaction has been advanced:

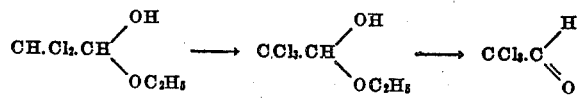

After twenty-four hours of chlorination the density of the mass is approximately 25° Bé. During the second day of chlorination the temperature is kept at 50° C. by circulating warm water or exhaust steam through the coil, and at the end of this day the density of the charge has usually been from 35° to 40° Bé. During the third day the temperature is allowed to reach 95° C., and when a density of 49° Bé. of the material in the reaction vessel has been reached, the reaction then is usually regarded as complete. By distilling this material with an equal volume of 66° Bé. sulfuric acid, a yield of about 70% crude chloral may be secured.

The reaction vessel has usually been lead lined. To avoid the loss of chlorine, it is customary to employ three kettles, separated one In any event, among the by-products of this reaction may be found ethyl chloride, ethylidene chloride, ethylene dichloride, and trichloroacetal $(CCl_3.CH(OC_2H_5)_2)$.

It is apparent that this process is at best a slow and hazardous one which is completely unattractive from the viewpoint of manufacturing chloral or chloral hydrate on a substantial commercial scale. My improved method, which is characterized essentially by the use of light as a catalyst in the chlorination of ethanol, has the definite advantages over this older procedure of rapidity and ease of operation to provide substantial volumes of product on the commercial scale. Moreover, the by-products secured in practicing the process just described, ethyl chloride, ethylidene chloride, and ethylene dichloride, are completely absent when my improved method is utilized.

It is, accordingly, one of the objects of this invention to provide an improved method for the manufacture of chloral and chloral hydrate by the chlorination of ethanol, which method can be operated commercially to yield large volumes of product without any of the hazards now incident to the manufacture of these products. Another object of my invention is to provide a much more rapid and direct method to the manufacture of chloral and chloral hydrate, a method which can be used to give substantial amounts of these products in industrial operations in a much shorter period of time than now required. Still another object of my invention is the development of a process for the manufacture of chloral and chloral hydrate which will permit the obtainment of yield much higher than those now possible of securement with presently available processes. Among other objects of my invention may be mentioned the development of procedures for producing these chemical products by operations which are continuous or semicontinuous in nature. These and still further objects obtainable by the use of my improved process for the preparation of chloral and chloral hydrate will be apparent from the ensuing disclosure of certain preferred embodiments thereof.

In carrying out my improved method the reaction between ethanol and chlorine is effected in the presence of light as an activation catalyst. This permits decreasing the time necessary for the chlorination in batch operations from 72 hours per cycle to from 18 to 24 hours per cycle. Ultraviolet light is unnecessary, although it can, of course, be utilized. I have found light from the ordinary tungsten filament incandescent bulb entirely satisfactory, and the so-called "daylight" fluorescent lamps give very satisfactory results. It may be remarked that the presence of appreciable amounts of oxygen during the chlorination tends to bring about considerable initial inhibition of the reaction.

My improved process can be operated (1) as a batch operation, (2) by a procedure which may be termed semicontinuous, or (3) as a continuous operation. Essentially the reactions occurring are the same whether the process is operated as a batch process, semicontinuously, or continuously, although the procedural steps may vary somewhat. In order that these procedures may be entirely apparent, I give below details of a preferred method for producing chloral and chloral hydrate, both in batch operations and in semicontinuous or continuous operations, although, of course, it should be understood that this is merely illustrative of preferred embodiments of my invention, and there are various other ways of accomplishing the same results which would still utilize the principles and discoveries of my invention.

The drawing illustrates the apparatus and process of Example 3.

BATCH OPERATION

Ethanol is placed in a closed reaction vessel and irradiated with light from a suitable light source. This may be an electric light bulb, a fluorescent lamp, light from a mercury arc, daylight, ultraviolet light, etc. Chlorine gas is fed into the ethanol in the presence of the radiation until the density of the reaction mixture falls generally within the range 1.50 to 1.53. The reaction vessel may be either glass lined or lead lined, and ethanol of from 70 per cent concentration to 100 per cent (absolute alcohol) may be employed.

For the first three to five hours of the chlorination the temperature of the reaction mixture is maintained below about 30° C. At the end of that time the reaction temperature is allowed to rise to 50–60° C., where it is preferably maintained for an additional three to five hours. The reaction temperature is then raised to 80–90° C., at which temperature the chlorination is completed. The entire chlorination may be completed in 18 to 24 hours, the use of light as an activation agent causing a decrease in the operating cycle from 72 hours to approximately one-third or one-fourth of that time.

SEMICONTINUOUS OPERATION

By the use of this procedure it is possible to eliminate the initial step of chlorinating the ethanol at a temperature below 30° C. for from three to five hours. In accordance with this procedure the first batch of ethanol is chlorinated by the batch operation described above. When the chlorination is complete, as shown by the density of the charge reaching 1.50–1.53, approximately 80 per cent of the charge is removed from the reaction vessel, which is then immediately charged with a quantity of alcohol equivalent to 80 per cent of that which has been removed. Because of the presence of the residual amount or "heel" of the high boiling material from the first operation, 20 per cent of which was retained, it is now possible to initiate chlorination at a temperature of 50–60° C. After from three to five hours at this temperature it is possible to raise the temperature still further, to one in the range 80–90° C., and then complete the chlorination in this elevated temperature. Eighty per cent of the charge then is again removed and the procedure repeated.

In this way the chlorination cycle ranges from 18 to 24 hours. It is evident that a portion of the reactor charge is continuously maintained in the chlorination vessel, this feature identifying the process as the semicontinuous method of operation.

This method possesses the important operating advantage of avoiding the necessity for employing brine cooling during the early stages of the reaction. It also avoids, to a large extent, the introduction of chlorine into essentially undiluted alcohol. If the rate of chlorine introduction into undiluted alcohol is too high, there is possibility of carbonization of the alcohol at the point where the chlorine stream is introduced.

CONTINUOUS OPERATION

It is possible to chlorinate ethanol, in accordance with my process, by a method which is truly continuous. In order to accomplish this, it is desirable to provide two reaction vessels, the reaction, in all the procedures described, being carried out in the presence of irradiation from a suitable light source such as an electric light bulb, daylight, fluorescent lights, carbon arc, mercury arc, etc., as hereinbefore described.

The first reaction vessel is filled with ethanol which is chlorinated in the presence of light in accordance with the batch procedure described above, until approximately 80 per cent of the theoretical quantity of chlorine has been introduced. When this point is reached, fresh ethyl alcohol, together with approximately 80 per cent of the theoretical quantity of chlorine needed for its complete chlorination, are simultaneously fed into the reaction vessel. This displaces some of the reaction product which spills out of the first reaction vessel through a liquid seal into the second reaction vessel.

When the second reaction vessel is fairly filled with the reaction product from the first vessel, the additional 20 per cent of the quantity of chlorine theoretically needed to complete the chlorination is fed into the second vessel. Both reactors are irradiated with light, and their contents preferably are stirred during the chlorination. The temperature in the first vessel is preferably maintained within the range 50–60° C., and the temperature in the second reaction vessel at 80–90° C. Under these conditions the reaction product is continuously delivered from the second reaction vessel and may be continuously or intermittently subjected to purification and recovery operations.

It will be apparent that by operating in accordance with this continuous procedure, there is no introduction of chlorine into undiluted alcohol, because the first reaction vessel always contains a relatively large proportion of the chlorinated product. Moreover, this process, because of its continuous character, is readily adapted for large-scale operation. The reaction vessels may be conveniently equipped with automatic controls so that the process can be operated with minimum supervision. By operating in this way, it is possible to convert the entire contents of the reaction system to chloral and/or chloral hydrate in a period of from 18 to 24 hours.

In the processes heretofore available to the industry for producing chloral or chloral hydrate by the chlorination of ethanol, it has been necessary to use substantially anhydrous alcohol. In utilizing anhydrous ethanol, it is impossible to secure satisfactory yields of chloral, as the major product of the chlorination is chloral alcoholate, $CCl_3CH(OH)OC_2H_5$, the reaction proceeding according to the equation:

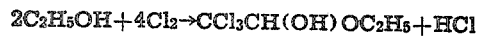

$$2C_2H_5OH + 4Cl_2 \rightarrow CCl_3CH(OH)OC_2H_5 + HCl$$

The maximum yield of chloral from this compound, based upon the amount of ethanol initially supplied, is 50 mol per cent.

I have found that by utilizing ethanol containing water, greatly improved yields of chloral are possible. In fact, if ethyl alcohol of from 70 to 80 per cent concentration is used as the starting material, the crude chlorination product consists to a major extent of chloral hydrate, the product which is ordinarily commercially desired. As will be apparent from the following equation representing the reaction, it is possible to obtain by the chlorination of dilute ethanol yields of chloral hydrate, $CCl_3CH(OH)_2$, approaching 100 mol per cent based on the amount of ethanol reacted:

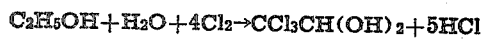

$$C_2H_5OH + H_2O + 4Cl_2 \rightarrow CCl_3CH(OH)_2 + 5HCl$$

Moreover, the crude reaction product obtained by chlorinating aqueous ethanol may be directly distilled to yield chloral hydrate of high purity. As chloral hydrate is the product usually desired, this is a marked advance in the art of preparing this compound, as all previous methods have necessitated the intermediate isolation of chloral, its purification, and subsequent reaction of the chloral with water to form the desired chloral hydrate.

As examples of my new and improved process for the preparation of chloral and chloral hydrate by chlorination of ethanol, the following are given:

*Example 1*

This example illustrates the batch chlorination of ethanol, utilizing 95 per cent ethanol as the starting material.

A five-gallon, glass-lined, jacketed vessel was fitted with a light well made of a "Pyrex" hard glass tube, a reflux condenser, a well for a thermometer, a stirrer, cooling coil, and an inlet tube for chlorine gas. The vessel was charged with 19.4 lbs. of ethanol of special denatured formula "2B" which consisted of 95% ethanol containing benzene as denaturant and corresponded to 17.8 lbs. of absolute ethanol.

A tungsten filament light bulb of 250 watts was inserted in the light well and turned on. Cooling brine was permitted to flow through the cooling coil to maintain the temperature in the reactor at or below about 30° C. A total of 16 lbs. of chlorine was passed in during a seven-hour reaction period, while the contents were continually stirred. At the end of four hours, when the density of the crude mixture was 1.07 (20°/4°), hydrogen chloride gas began to be evolved from the reaction vessel. This was absorbed by means of a suitable scrubbing system. At the end of seven hours the temperature of the contents of the reaction vessel was allowed to rise to about 60° C., and held at that temperature for five hours while 17 lbs. of additional chlorine was introduced.

The temperature of the material within the reaction vessel was then allowed to rise to 80–90° C. Additional chlorine in the amount of 38 lbs. was added as rapidly as possible. At the conclusion of this period the reaction mixture had a density of 1.50 and weighed 32.65 lbs.

A sample of the crude product was fractionated through a four-foot packed column and gave the following products:

| | Per cent |
|---|---|
| Low boiling compounds (some chloral hydrate) | 25.0 |
| Chloral hydrate (B. P. 96°–98° C.) | 35.0 |
| Chloral alcoholate (B. P. 114°–116° C.) | 30.0 |
| High boiling compounds (some chloral acetal) | 10.0 |

When the entire contents of the chlorination vessel was treated with an equal weight of 95 per cent sulfuric acid and then distilled to a pot temperature of 135° C., 23.8 lbs. of crude chloral was secured. By fractionating this crude product, 18.2 lbs. of pure chloral was obtained. This amounts to a yield of 100 lbs. of pure chloral for each 98 lbs. of ethanol reacted and 390 lbs. of chlorine introduced. Of this amount of chlorine a total of 10 per cent came through the reaction vessel unused. It could be recycled, if desired, giving a net use of 351 lbs. of chlorine for each 100 lbs. of pure chloral produced.

The yield may be increased by rechlorination of the low boiling material (primarily dichloroacetaldehyde) secured upon fractionation of the crude chloral. This material could be conveniently recycled by mixing with the next batch of ethanol chlorinated.

In order to prevent spontaneous polymerization of the chloral during processing and storage, it is desirable to introduce, in small amounts, hydroquinone or some other anti-oxidant. It is possible to substitute absolute alcohol for the 95 per cent ethanol utilized without any marked change in procedure, although the yield of chloral will be considerably reduced.

Example 2

This example illustrates the chlorination of ethanol in accordance with my semicontinuous procedure.

Utilizing the same apparatus described in Example 1, a charge was prepared consisting of 7.5 lbs. of the reaction product from a preceding batch prepared in accordance with the procedure of Example 1, and 15.8 lbs. of alcohol of the special denatured formula "2B" containing 14.5 lbs. of absolute ethanol.

The contents of the reaction vessel was heated to 50-55° C. Stirring and illumination were begun, and the chlorine stream introduced. During a period of seven hours a total of 25 lbs. of chlorine was introduced, the temperature in the meanwhile being maintained at 55° C. by flowing cooling liquid through the cooling coils.

The contents of the reaction vessel was then heated to a temperature of 80-90° C. and an additional 35 lbs. of chlorine introduced during the next 14 hours. At the end of this period the density of the reaction product was 1.503 (20°/15°), which amounted to 37.8 lbs., a total of 30.3 lbs. of reaction product having been made during the chlorination.

By treating the material with an equal weight of concentrated sulfuric acid and then distilling to a pot temperature of 135° C., there was obtained a total of 22.2 lbs. of crude chloral. By fractionation there was secured from this 16.65 lbs. of refined choral. This is a yield of 100 lbs. of pure chloral for each 87 lbs. of ethanol charged and for each 361 lbs. of chlorine introduced. Of this 367 lbs. of chlorine introduced a total of 35 lbs. came through the reaction vessel unchanged. This could be recycled, and it is obvious that there was a net yield of 100 lbs. of pure chloral for each 332 lbs. of chlorine reacted.

Example 3

This example illustrates continuous chlorination. Two glass vessels were used. The first vessel was equipped with a stirrer, a light well, a reflux condenser, inlet lines for chlorine and alcohol, a well for a thermometer, and an overflow line with a U-bend in it which served as a liquid seal. The overflow line was positioned to maintain the vessel about two thirds full.

The second vessel was connected to the overflow line from the first flask. It was provided with a stirrer, a light well, a well for a thermometer, a reflux condenser, an inlet tube for chlorine, and an overflow line leading to a vented receiver. This overflow line also maintained this vessel two thirds full. The reflux condensers were connected to suitable scrubbing systems for absorption of HCl.

The first vessel was charged with 400 grams of 95 per cent ethanol and was chlorinated, as in Example 1, until approximately 900 grams of chlorine had been added. At this point the product began to spill into the second vessel through the overflow line. The temperature in the first vessel was maintained at 50-60° C., and 95 per cent ethanol was now introduced with the chlorine at a rate corresponding to 0.5 cubic centimeter of ethanol and 1.0 gram of chlorine per minute.

As the second vessel filled with the product, it was heated to a temperature of 80-90° C., the light was turned on, agitation begun, and chlorine fed at the rate of about 0.8 gram per minute. The product soon began to spill out through the overflow line into the vented receiver.

When the system had attained a constant rate of production, the density of the contents of the first vessel was 1.36 (20°/4°), and the density of the product in the second vessel was 1.504 (20°/4°). By feeding the reactants at the indicated rates, the rate of production was approximately 0.6 gram per minute of crude chlorinated product.

From a total of 115 grams of 95 per cent ethanol and 298 grams of chlorine actually absorbed by the system in slightly less than six hours, a total of 208 grams of product was recovered. A small portion of this product was recovered from the scrubbing system. By treating the product as in the preceding examples, with approximately equal weight of concentrated sulfuric acid, crude chloral in the amount of 148 grams was secured. From this there was secured, by fractionation, 115 grams of refined chloral. This is a yield of 100 lbs. for each 100 lbs. of 95 per cent ethanol and each 260 lbs. of chlorine used.

Example 4

Ethanol in the amount of 1015 grams was diluted with water to give a total weight of 1240 grams of dilute ethanol of 82 per cent concentration. This was introduced into the batch apparatus described in Example 1 and chlorinated for 24 hours until the product had a density of 1.509 (20°/4°). During this time 5475 grams of chlorine were fed, of which 1485 grams passed unused through the system and could be subsequently recycled. The yield of product was 2274 grams.

By fractionation of a sample of 312 grams of this product the following products in the amounts noted were recovered:

| Fraction No. | Boiling Range | Weight |
|---|---|---|
| | | Grams |
| 1 | Hydrogen chloride gas evolved on refluxing | 6 |
| 2 | Material boiling to 96° C | 16 |
| 3 | Material boiling between 96°-98.5° C | 183 |
| 4 | Material boiling between 98.5°-113.6° C | 14 |
| 5 | Material boiling between 113.6°-114.2° C | 52 |
| 6 | Residue and losses | 41 |

Fraction 3 was practically pure chloral hydrate, and constituted 59 per cent of the total reaction product. Fraction 5 was practically pure chloral alcoholate. By treating 1000 grams of the crude product with approximately equal weight of sulfuric acid, there was secured 723 grams of crude chloral. Upon fractionation this yielded 526 grams of refined chloral. This represents a yield of 100 lbs. of refined chloral for each 86 lbs. of ethanol and each 337 lbs. of chlorine reacted.

As various changes and modifications may be made in my improved procedure for preparing chloral and chloral hydrate, certain preferred embodiments of which have been described herein as illustrated, without departing from the spirit or scope of my invention, it is intended that that invention shall be construed to include these variations and changes to the extent that they are within the scope of the appended claim.

Reference is made to my continuing application Serial No. 566,015 filed November 30, 1944, now Patent No. 2,443,183 issued June 15, 1948, which is a continuation-in-part of the present application and in which there is claimed certain of the subject matter herein disclosed including initiating the chlorination in the presence of previously chlorinated material, the use of a continuous process, and the return of underchlorinated material to the chlorination step.

I claim:

In a process for the production of chloral and chloral hydrate the steps comprising passing gaseous chlorine into 70% to 95% ethanol at a temperature not exceeding 30° C. for a period of about 3 to 5 hours, passing gaseous chlorine into said reaction mixture for a period of about 3 to 5 hours while maintaining the temperature thereof between about 50° C. and 60° C., then passing gaseous chlorine into the reaction mixture until it reaches a density of between about 1.50 and 1.53 while maintaining the temperature thereof between about 80° C. and 90° C., the said chlorination steps being carried out in the presence of light.

OLIVER W. CASS.

REFERENCES CITED

The following references are of record in the file of this patent:

UNITED STATES PATENTS

| Number | Name | Date |
| --- | --- | --- |
| 774,151 | Besson | Nov. 8, 1904 |
| 1,828,858 | Conklin | Oct. 27, 1931 |
| 2,065,400 | Salzberg et al. | Dec. 22, 1936 |
| 2,351,000 | Brown | June 13, 1944 |

FOREIGN PATENTS

| Number | Country | Date |
| --- | --- | --- |
| 612,396 | France | Oct. 22, 1926 |

OTHER REFERENCES

Koidzumi, Chemical Abstracts, vol. 19 (1925), page 2606.

Beilstein, Handbuch der Organischen Chemie, 4th edition, vol. 1 (1918), pages 611, 614, 616, 621 and 622.

Paterno, Annalen der Chemie und Pharmacie, vol. 150 (1869), pages 253–255.

Dispensatory of the U. S. of America, 21st edition (1926), page 323.